United States Patent
Sutskover

(10) Patent No.: US 8,446,982 B2
(45) Date of Patent: May 21, 2013

(54) BEAMFORMING BY ANTENNA PUNCTURING

(75) Inventor: Ilan Sutskover, Hadera (IS)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/251,986

(22) Filed: Oct. 3, 2011

(65) Prior Publication Data

US 2012/0027114 A1 Feb. 2, 2012

Related U.S. Application Data

(63) Continuation of application No. 12/870,709, filed on Aug. 27, 2010, now Pat. No. 8,031,805, which is a continuation of application No. 11/527,128, filed on Sep. 26, 2006, now Pat. No. 7,787,567.

(51) Int. Cl.
*H04L 27/00* (2006.01)

(52) U.S. Cl.
USPC .......................................................... 375/299

(58) Field of Classification Search
USPC ................................. 375/260, 295, 299, 267
See application file for complete search history.

(56) References Cited

U.S. PATENT DOCUMENTS

| | | | |
|---|---|---|---|
| 6,965,762 B2 | 11/2005 | Sugar et al. | |
| 7,068,981 B2 | 6/2006 | Sim | |
| 7,430,243 B2 * | 9/2008 | Giannakis et al. | 375/267 |
| 7,787,567 B2 | 8/2010 | Sutskover | |
| 8,031,805 B2 | 10/2011 | Sutskover | |
| 2004/0151256 A1 | 8/2004 | Hwang et al. | |
| 2006/0034382 A1* | 2/2006 | Ozluturk et al. | 375/267 |
| 2008/0075187 A1 | 3/2008 | Sutskover | |
| 2010/0322335 A1 | 12/2010 | Sutskover | |

FOREIGN PATENT DOCUMENTS

| | | |
|---|---|---|
| CN | 101517920 A | 8/2009 |
| EP | 1553714 A1 | 7/2005 |
| EP | 1796300 A1 | 6/2007 |
| EP | 2076975 A | 7/2009 |
| EP | 2136497 A1 | 12/2009 |
| JP | 2000-209145 A | 7/2000 |
| JP | 200194530 A | 4/2001 |
| JP | 2004-120730 A | 4/2004 |
| JP | 2004229293 A | 8/2004 |
| JP | 2005521327 A | 7/2005 |
| JP | 2006-140853 A | 6/2006 |

(Continued)

OTHER PUBLICATIONS

Office Action received for Taiwanese Patent Application No. 96135744, mailed on Apr. 28, 2011, 7 pages of Taiwanese office action and 8 pages of English translation.

(Continued)

*Primary Examiner* — Kevin Kim
(74) *Attorney, Agent, or Firm* — Thorpe North & Western, LLP

(57) ABSTRACT

Beamforming is provided for a wireless MIMO device by using antenna puncturing to reduce the number of transmit antennas that are used to transmit data for certain subcarriers. In a conventional approach, if N spatial streams are being used to provide spatial multiplexing, then N transmit antennas would be used to transmit for each subcarrier. In at least one embodiment of the invention, enhancements in channel capacity are achieved by using less than N transmit antennas for one or more subcarriers.

20 Claims, 7 Drawing Sheets

FOREIGN PATENT DOCUMENTS

| | | |
|---|---|---|
| JP | 2007517455 A | 6/2007 |
| JP | 2009505560 A | 2/2009 |
| TW | 200304287 B | 9/2003 |
| TW | 200830764 A | 7/2008 |
| WO | 2005/062729 A2 | 7/2005 |
| WO | 2006/035637 A1 | 4/2006 |
| WO | 2006/055646 A2 | 5/2006 |
| WO | 2008/039867 A1 | 4/2008 |
| WO | 2011088805 A1 | 7/2011 |

OTHER PUBLICATIONS

International Search Report and Written Opinion received for PCT Application No. PCT/US2007/079589, mailed on Feb. 4, 2008,10 pages.

"Description and link simulations of MIMO schemes for OFDMA based E-UTRA downlink evaluation", 3GPP TSG-RAN WG1 #42, Aug. 29-Sep. 2, 2005, 12 pages.

Molisch et al.,"Capacity of MIMO Systems With Antenna Selection", IEEE Transactions on Wireless Communications, vol. 4, No. 4, Jul. 5, 2005, pp. 1759-1772.

International Preliminary Report on Patentability and Written Opinion received for PCT Patent Application No. PCT/US2007/079589, mailed on Apr. 9, 2009, 6 pages.

Rajan et al., "Transmit Diversity Schemes for CDMA-2000", IEEE Proceedings of Wireless Communication and Networking Conference, vol. 2, Sep. 1999, pp. 669-673.

Sanayei et al., "Capacity of MIMO Channels with Antenna Selection", Department of Electrical Engineering, Feb. 17, 2005, pp. 1-18.

Choi et al., "Fast algorithms for antenna selection in MIMO Systems", IEEE 58th Vehicular Technology Conference, vol. 3, Oct. 6-9, 2003. pp. 1733-1737.

Office Action received for Japanese Patent Application No. 2009524826, mailed on Nov. 15, 2011, 2 pages of English Translation.

Office Action Received Mar. 7, 2012, Application Serial No. 200780035396.1, 6 pages.

Office Action Received for the US Patent Application No. 2009-524826, mailed Jul. 17, 2012, 4 pages.

Notice of Allowance Received for the Taiwan Patent Application No. 96135744, mailed on Aug. 29, 2011, 2 pages.

Office Action received for Chinese Patent Application No. 200780035396.1, mailed on Dec. 4, 2012, 7 pages of Office Action including 4 pages of English translation.

Notice of Allowance received for Japanese Patent Application No. 2009-524826, mailed on Nov. 6, 2012, 2 pages.

\* cited by examiner

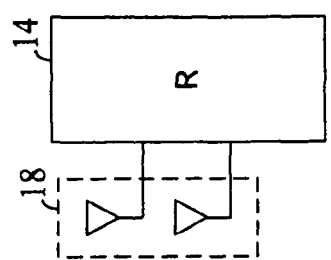
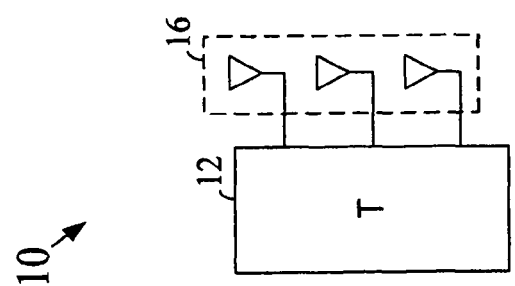
Fig. 1

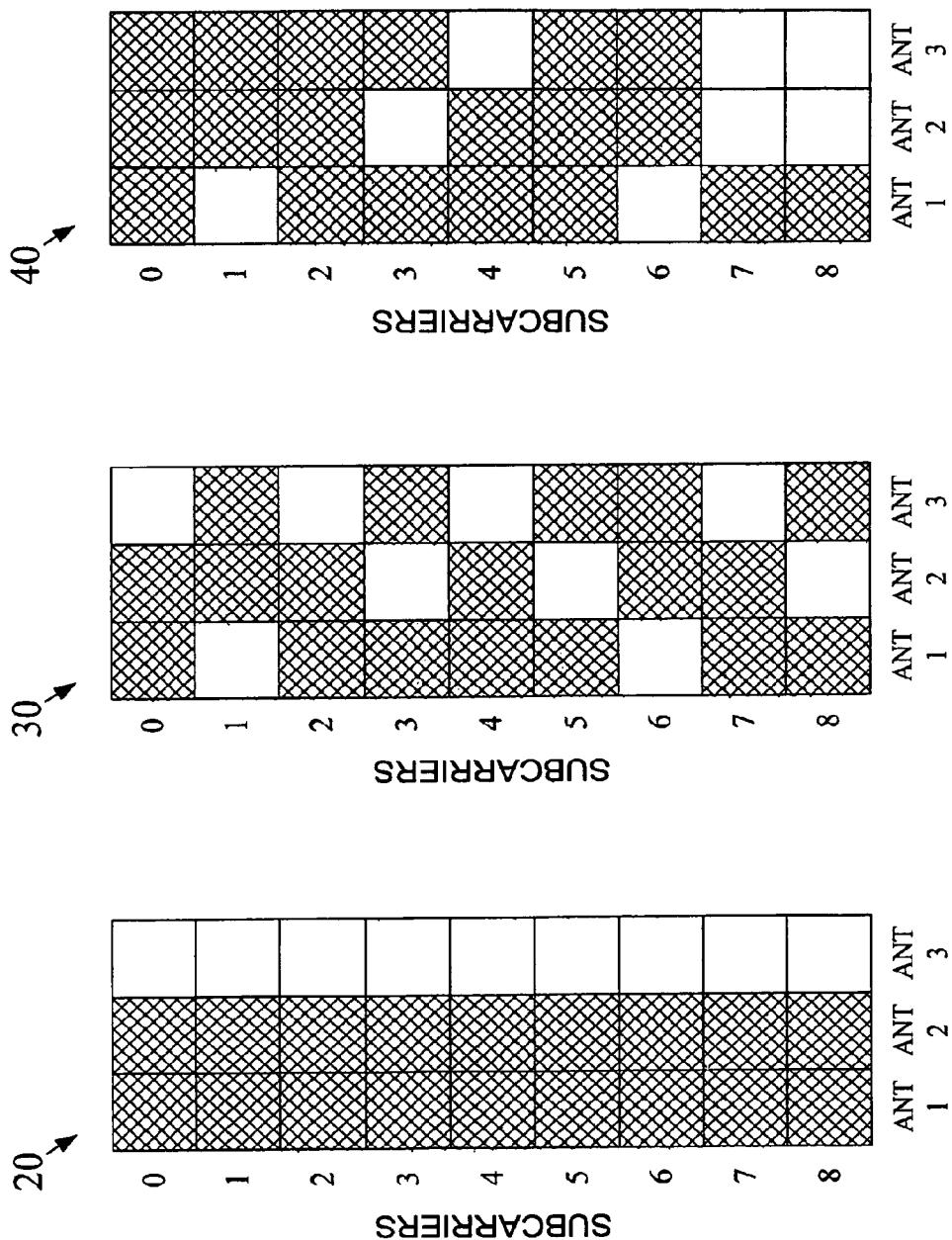

BEAMFORMING BY ANTENNA PUNCTURING

CROSS REFERENCE TO RELATED APPLICATIONS

This application is a Continuation of U.S. patent application Ser. No. 12/870,709, filed on Aug. 27, 2010 which is a Continuation of U.S. patent application Ser. No. 11/527,128, filed Sep. 26, 2006, entitled "BEAMFORMING BY ANTENNA PUNCTURING," both of which are incorporated by reference herein in their entirety.

TECHNICAL FIELD

The invention relates generally to electronic communication and, more particularly, to techniques for performing beamforming in communication systems.

BACKGROUND OF THE INVENTION

Multiple input, multiple output (MIMO) is a communication technique that uses multiple antennas (or other transducers) at each end of a communication channel. For example, multiple transmit antennas may be used to transmit signals into a wireless channel and multiple receive antennas may be used to receive signals at the other end of the channel. MIMO technology is capable of providing improved spectral efficiency in the channel by providing benefits such as array gain, diversity gain, and increased co-channel interference rejection. These benefits can be used to provide increases in data rate, communication range, reliability, number of users services, and/or other operational parameters. Multicarrier communication is a technique that uses a number of relatively narrowband subchannels to transmit data from one point to another. Multicarrier technologies, such as orthogonal frequency division multiplexing (OFDM), can be used to provide resistance to intersymbol interference (ISI) and other harmful channel effects. Strategies are needed for efficiently implementing multicarrier communication techniques within MIMO based systems.

BRIEF DESCRIPTION OF THE DRAWINGS

FIG. 1 is a block diagram illustrating an example wireless network arrangement that may incorporate features of the present invention;

FIGS. 2, 3, and 4 are diagrams illustrating the difference between traditional antenna selection and antenna puncturing in accordance with an embodiment of the present invention;

DETAILED DESCRIPTION

Figure 5:
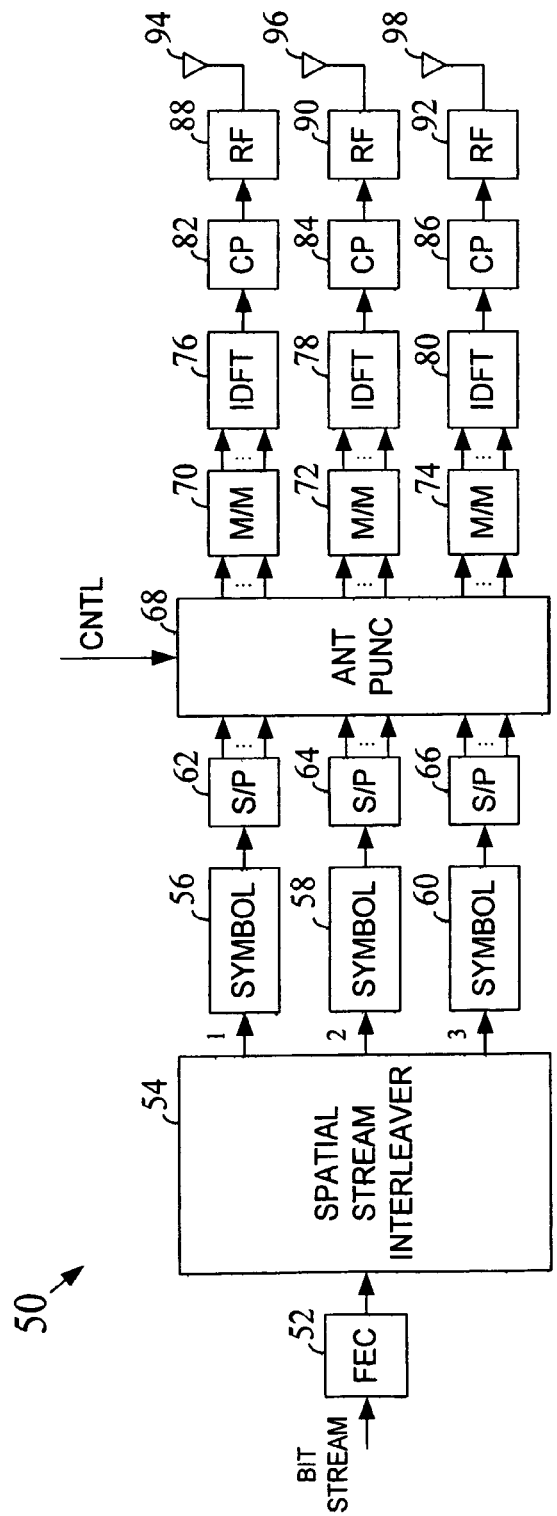
FIG. 5 is a block diagram illustrating an example transmitter system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless network arrangement 10 that may incorporate features of the present invention. As shown, a transmitting device 12 is communicating with a receiving device 14 via a wireless channel. The transmitting device 12 and the receiving device 14 both include multiple antennas. For example, in the illustrated embodiment, the transmitting device 12 includes three transmit antennas 16 and the receiving device 14 includes two receive antennas 18. In other embodiments, different numbers of antennas may be used. Any type of antennas may be used including, for example, dipoles, patches, helical antennas, and/or others. Because both the transmitting device 12 and the receiving device 14 have multiple antennas, multiple input, multiple output (MIMO) techniques may be used to transmit data through the wireless channel. When MIMO is used, the wireless channel may be referred to as a MIMO channel. The transmitting device 12 and the receiving device 14 may each be associated with any type of device or system that is capable of communicating wirelessly. This may include, for example, a laptop, palmtop, desktop, or tablet computer having wireless networking capability, a personal digital assistant (PDA) having wireless networking capability, a cellular telephone or other handheld wireless communicator, a wireless base station or access point, a wireless network client device, a satellite communicator, a transceiver within a communication satellite, a transceiver associated with a terrestrial wireless link, an ultra-mobile personal computer (UMPC), a pager, and/or other devices or systems.

In one MIMO technique, known as spatial multiplexing, input data is split into N spatial streams before transmission (where N is a positive integer greater than 1). Data from the N spatial streams may then be independently and simultaneously transmitted into the MIMO channel using N transmit antennas. The receiver at the other side of the MIMO channel is then able to de-multiplex the N spatial streams as long as the number of receive antennas is greater than or equal to the number of transmit antennas. The receiving device may include, for example, a maximum likelihood (ML) receiver, a zero-forcing receiver, a minimum mean square error (MMSE) receiver, and/or some other type of receiver for use in recovering the transmitted data. Because an independent symbol stream is transmitted by each antenna, spatial multiplexing can achieve relatively high throughput in a MIMO channel.

Multicarrier communication is a technique that uses a plurality of subcarriers to transmit data, in parallel, through a channel. One form of multicarrier communication that is presently very popular is orthogonal frequency division multiplexing (OFDM), which uses multiple orthogonal subcarriers to transmit data through a channel. Other forms of multicarrier communication also exist. In one aspect of the present invention, techniques are provided for improving performance in MIMO systems that use multicarrier communication techniques.

Antenna selection is a technique that may be used within a MIMO-enabled device or network to select less than an available number of antennas for active communication. When spatial multiplexing is being used in a MIMO channel, one transmit antenna is typically used for each spatial stream. Thus, when antenna selection is implemented alongside spatial multiplexing, the number of antennas that are selected is made equal to the number of spatial streams being used. In conceiving the present invention, it was determined that additional capacity gains can be achieved by loosening the constraint on the number of transmit antennas to allow further reduction in the number of antennas used to perform spatial multiplexing, on a subcarrier by subcarrier basis. This technique is referred to herein as "antenna puncturing." Antenna puncturing recognizes that, for some subcarriers, using a number of antennas that is less than the number of spatial streams can result in a higher overall capacity for the corresponding MIMO channel.

FIGS. 2, 3, and 4 are diagrams illustrating the difference between traditional antenna selection and antenna puncturing in accordance with an embodiment of the present invention. Each of these figures represents a transmission scenario at a particular transmit time within a multicarrier MIMO system that uses nine sub-carriers (represented as rows) and where there are three available transmit antennas (represented as columns). Crosshatching is used in the figures to identify antennas that are active for a particular subcarrier. FIGS. 2 and 3 illustrate the use of antenna selection in a spatial multiplexing arrangement that uses two spatial streams. In the example shown in FIG. 2, an antenna selection process is used that selects the same two antennas for each of the subcarriers (i.e., subcarriers 0-8). In the example of FIG. 3, an antenna selection process is used that can select a different set of two antennas for each of the subcarriers. In both FIG. 2 and FIG. 3, the number of antennas selected for each subcarrier is equal to the number of spatial streams. That is, for each subcarrier, one antenna is selected for each spatial stream.

FIG. 4 illustrates an example use of antenna puncturing for a MIMO channel that uses spatial multiplexing with three spatial streams in accordance with an embodiment of the present invention. As shown, a different number of active antennas may be selected for each subcarrier in the multicarrier band. For example, with reference to FIG. 4, three antennas are active for subcarrier 0, two antennas are active for subcarrier 1, three antennas are active for subcarrier 2, two antennas are active for subcarrier 3, and so on. Thus, the number of antennas that are active for each subcarrier does not have to be equal to the number of spatial streams that are being used (i.e., it can be less). When the number of antennas that is used for a subcarrier is less than the number of spatial streams, one or more of the data symbols associated with that subcarrier is not transmitted (i.e., the symbol is erased). Another way to look at it is that these symbols are transmitted with zero power. The erased symbols may be recovered in the receiving device using the error correction capabilities of the corresponding FEC code. Antenna puncturing is similar to the concept of code puncturing in coding where one or more code bits may be left out (or punctured) to adjust the rate of the code being used.

The purpose of antenna puncturing in a MIMO channel is typically to enhance some performance characteristic of the channel (e.g., channel capacity). In one possible approach, the antenna puncturing computations may be carried out in a receiving device, using channel information generated in the receiving device. The receiving device may then feed the antenna puncture information back to the transmitting device for use in a subsequent transmission. In another possible approach, the antenna puncturing computations may be carried out in the transmitting device itself when channel information is available therein (e.g., if implicit or explicit feedback is used in a closed loop MIMO embodiment, etc.). Sometimes, when multiple antennas are transmitting at the same frequency within a common MIMO channel, one of the transmit antennas will cause a large amount of interference for the other transmit antennas for a particular subcarrier. Antenna puncturing can be used to prevent the interference-causing antenna from transmitting for that subcarrier, thereby reducing interference and improving capacity. When a channel matrix for a MIMO channel has two or more equal (or near equal) columns, then one of the transmit antennas being used may be an interference-causing antenna as described above.

In general, antenna puncturing is a form of beamforming that may be used to enhance the capacity of a MIMO channel. An optimal method of beamforming in a MIMO system is known as singular value decomposition (SVD) MIMO. When SVD techniques are used to perform beamforming, optimal levels of capacity enhancement can be achieved. However, SVD MIMO requires a large amount of feedback to be transmitted from a receiving device to the transmitting device. At the opposite end of the spectrum is "spatial expansion" which requires no feedback, but provides relatively little capacity enhancement. Antenna puncturing provides a tradeoff between SVD MIMO and spatial expansion. That is, it provides an intermediate level of capacity enhancement while requiring a relatively small amount of feedback (i.e., when the antenna puncturing determinations are performed in the receiving device). In some embodiments, antenna puncturing may be implemented using only a few bits of feedback per subcarrier. In a 3×3 MIMO implementation, this is around one twentieth the amount of feedback required by SVD. Antenna puncturing also allows the error correcting codes to be confined to the same finite set of rates and modulations used by antenna selection implementations.

When antenna puncturing information is computed within a receiving device and is fed back to the transmitting device, the receiving device will know where the puncturing is going to take place in the ensuing transmission. This information may be used by the receiving device to decode the received information more reliably. The receiver may, for example, avoid noise-only subcarriers by nulling them instead of trying to determine which constellation point was transmitted.

FIG. 5 is a block diagram illustrating an example transmitter system 50 in accordance with an embodiment of the present invention. As will be described in greater detail, the transmitter system 50 is capable of performing antenna puncturing in a multicarrier, MIMO-based network. It should be appreciated that the transmitter of FIG. 5 is merely an example of one type of architecture that may be used to perform antenna puncturing within a wireless device or system. Other transmitter arrangements may alternatively be used. As illustrated in FIG. 5, the transmitter system 50 may include: a forward error correction (FEC) encoder 52; a spatial stream interleaver 54; first, second, and third symbol generators 56, 58, 60; first, second, and third serial-to-parallel (S/P) converters 62, 64, 66; antenna puncture logic 68; first, second, and third mapper/modulators (M/Ms) 70, 72, 74; first, second, and third inverse discrete Fourier transform (IDFT) units 76, 78, 80; first, second, and third cyclic prefix (CP) inserters 82, 84, 86; first, second, and third radio frequency (RF) transmitters 88, 90, 92; and first, second, and third transmit antennas 94, 96, 98. The FEC encoder 52 encodes an input bit stream using a predetermined error correction code. The spatial stream interleaver 54 may then interleave the serial stream of encoded bits into multiple spatial streams for use in providing spatial multiplexing. In the illustrated embodiment, the number of spatial streams generated by the spatial stream interleaver 54 is three, which is also the number of available transmit antennas 94, 96, 98. The number of spatial streams, the number of available transmit antennas, and the number of subcarriers per multicarrier symbol may vary from implementation to implementation.

The first, second, and third symbol generators 56, 58, 60 each receive the encoded bits for a corresponding spatial stream and group the bits into symbols based on one or more modulation schemes. The S/P converters 62, 64, 66 may each convert a serial stream of symbols associated with a corresponding spatial stream to a parallel representation associated with the subcarriers of a multicarrier symbol (e.g., an OFDM symbol). Thus, each symbol will be associated with a subcarrier based on its location in the parallel representation. The antenna puncture logic 68 may then apply antenna puncturing for the individual subcarriers of the spatial streams. As illustrated, the antenna puncture logic 68 may perform the antenna puncturing in response to control information. As described previously, in some embodiments, the receiving device may generate the antenna puncture control information and feed it back to the transmitting device. This feedback information (or a derivative thereof) may then be delivered to the antenna puncture logic 68. In other embodiments, the antenna puncture control information may be generated within the local device that is performing the puncturing (or elsewhere).

The antenna punctured data output by the antenna puncture logic 68 is directed to the M/Ms 70, 72, 74 which convert the bits of each symbol to constellation points associated with the modulation scheme being used. The constellation points may then be used to modulate the corresponding data subcarriers of the multicarrier symbol. Although not shown, pilot symbols/tones will typically be added at some point in the processing. The modulated subcarriers for each spatial stream may next be delivered to a corresponding IDFT 76, 78, 80 for conversion from a frequency domain representation to a time domain representation. Any type of IDFT may be used including, for example, an inverse fast Fourier transform (IFFT). The IDFTs 76, 78, 80 may apply a parallel-to-serial conversion to the time domain samples at an output thereof. The CP inserters 82, 84, 86 each insert a cyclic prefix to a corresponding time domain signal to complete a multicarrier symbol. The multicarrier symbols may then be directed to the corresponding RF transmitters 88, 90, 92 which convert them from baseband signals to RF signals. The RF signals can then be transmitted from the corresponding antennas 94, 96, 98. The RF transmitters 88, 90, 92 may each perform functions such as, for example, digital-to-analog conversion, up-conversion, signal amplification, signal filtration, and/or other functions commonly performed in an RF transmitter.

Figure 6:
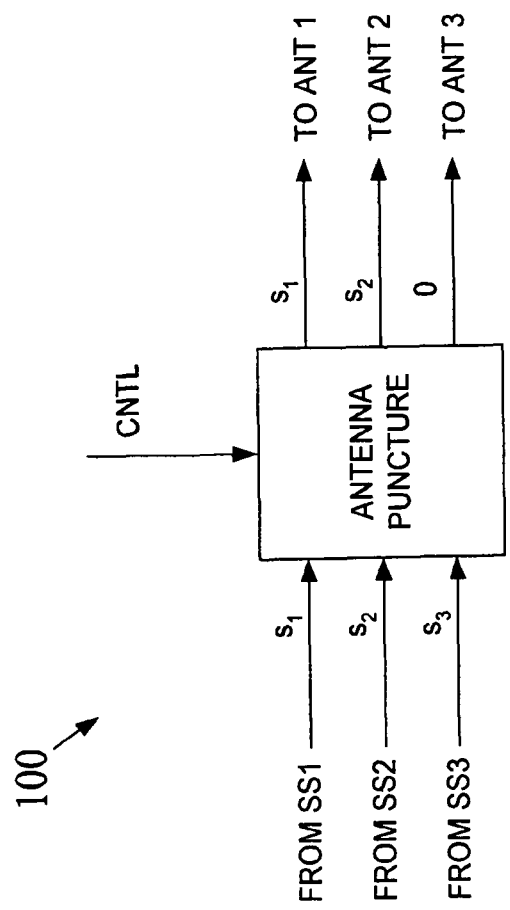
FIG. 6 is a block diagram illustrating example antenna puncture logic that can be used to perform antenna puncturing within a transmitter system for a single subcarrier in accordance with an embodiment of the present invention.

FIG. 6 is a block diagram illustrating example antenna puncture logic 100 that can be used to perform antenna puncturing within a transmitter system in accordance with an embodiment of the present invention. The antenna puncture logic 100 of FIG. 6 is for use with a single subcarrier. Separate antenna puncture logic 100 may be provided for each subcarrier or multiple subcarriers may share an antenna puncture logic 100. In at least one embodiment, a single antenna puncture logic 100 is used for all of the subcarriers (e.g., one after another) in the multicarrier bandwidth. The antenna puncture logic 100 may also be implemented in software. As shown in FIG. 6, the antenna puncture logic 100 may receive one symbol from each spatial stream (i.e., symbol $s_1$ from SS1, symbol $s_2$ from SS2, and symbol $s_3$ from SS3) that corresponds to a particular subcarrier. Based on control information, the antenna puncture logic 100 may replace one or more of the input symbols with a zero or some other predetermined (dummy) symbol at a corresponding output. For instance, in the example of FIG. 6, the antenna puncture logic 100 passes symbols $s_1$ and $s_2$ through to corresponding outputs, but replaces symbol $s_3$ with a zero. With different control information, other puncture patterns can be achieved. In one possible approach, the antenna puncture logic 100 may perform the puncturing function by multiplying a column vector of input symbols by a puncture matrix to achieve the output symbols, as follows:

$$\begin{bmatrix} s'_1 \\ s'_2 \\ s'_3 \end{bmatrix} = P \cdot \begin{bmatrix} s_1 \\ s_2 \\ s_3 \end{bmatrix}$$

where P is the puncture matrix, $S_i$ are the input symbols, and $S'_i$ are the output symbols. If there is no puncturing to be done for a particular subcarrier, the puncture matrix may be, for example, the identity matrix:

$$P = \begin{bmatrix} 1 & 0 & 0 \\ 0 & 1 & 0 \\ 0 & 0 & 1 \end{bmatrix}$$

If puncturing is to be performed, some possible puncture matrices may include:

$$P = \begin{bmatrix} 1 & 0 & 0 \\ 0 & 0 & 0 \\ 0 & 0 & 1 \end{bmatrix},$$

$$P = \begin{bmatrix} 1 & 0 & 0 \\ 0 & 1 & 0 \\ 0 & 0 & 0 \end{bmatrix},$$

$$P = \begin{bmatrix} 0 & 0 & 0 \\ 0 & 0 & 1 \\ 0 & 1 & 0 \end{bmatrix},$$

and so on. As described previously, any number of antennas may be punctured for a particular subcarrier, except that at least one antenna will typically remain active for each subcarrier. In at least one embodiment of the invention, the antenna puncture logic 100 may be implemented as part of the mapper/modulators of a device (e.g., M/Ms 66, 68, 70 in FIG. 5). For example, control signals may be delivered to the mapper/modulators to control which antennas will transmit with zero transmit power for each subcarrier. Other techniques for performing the antenna puncturing may alternatively be used.

In at least one embodiment of the present invention, the total transmit power assigned to a subcarrier is maintained when antenna puncturing is being performed. In a typical scenario where N transmit antennas are being used for N spatial streams and the power assigned to a particular subcarrier is $P_i$ the power used for each antenna for that subcarrier would be $P_i/N$. If antenna puncturing is used, then the power assigned to each active antenna may increase. For example, if L antennas are active (L<N) for a subcarrier when antenna puncturing is being used, then the power assigned to each antenna may be $P_i/L$, which is greater than $P_i/N$. In some other embodiments, the power assigned to the L selected antennas may remain the same as they would have been had puncturing not been used (i.e., $P_i/N$). Other transmit power schemes may alternatively be used. In at least one embodiment, the power levels for each subcarrier are applied within the mapper/modulators (e.g., M/Ms 66, 68, 70 in FIG. 5).

Figure 7:
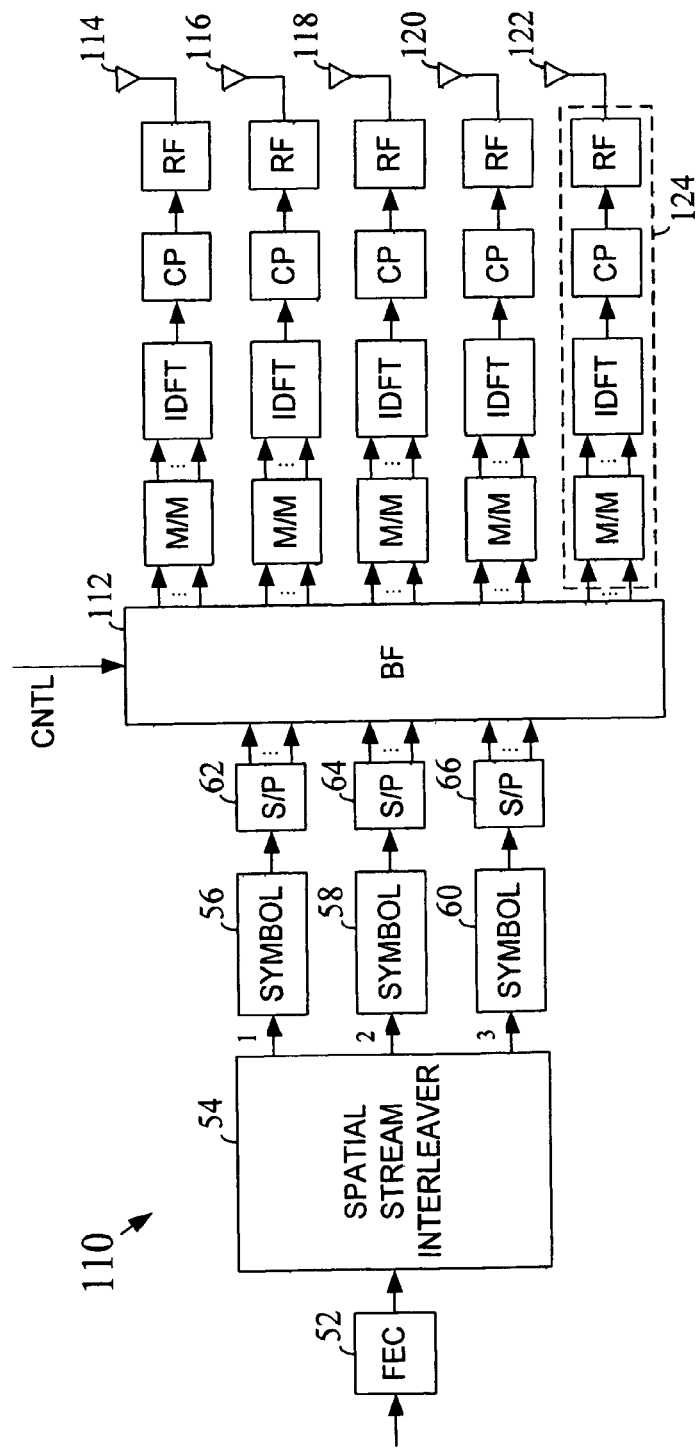
FIG. 7 is a block diagram illustrating another example transmitter system that can be used in accordance with an embodiment of the present invention.

In the transmitter system 50 of FIG. 5, the number of spatial streams is equal to the number of available transmit antennas. FIG. 7 is a block diagram illustrating an example transmitter system 110 that can be used to perform antenna puncturing when the number of available antennas is greater than the number of spatial streams. As shown, the transmitter system 110 generates three spatial streams, but has 5 available transmit antennas 114, 116, 118, 120, 122. In addition, the transmitter system 110 includes a dedicated transmit chain 124 for each of the 5 available transmit antennas 114, 116, 118, 120, 122. The transmitter system 110 includes beamforming logic 112 to perform the antenna selection function which includes the antenna puncturing. That is, for each subcarrier, the beamforming logic 112 can direct the symbols from the three spatial streams to three or less of the transmit antennas 114, 116, 118, 120, 122, based on control information. In one possible approach, the same three antennas may be used for each of the subcarriers in the system, but some of the subcarriers can also contain antenna puncturing for these three antennas. In another approach, a different combination of transmit antennas (from 1 to 3 antennas each) may be selected from the available 5 for each subcarrier in the system. Using this approach, all 5 of the antennas may be used during a transmission, but only a maximum of three antennas will be used per subcarrier.

In at least one embodiment, the beamforming logic 112 may simply multiply a column vector of input symbols for a particular subcarrier by a beamforming matrix to achieve a vector of output symbols for the subcarrier. The output symbols may then be distributed to the appropriate mapper/modulators. For example, if antennas 114, 116, and 118 were selected for a subcarrier, without any puncturing, then the following beamforming matrix may be used:

$$W = \begin{bmatrix} 1 & 0 & 0 \\ 0 & 1 & 0 \\ 0 & 0 & 1 \\ 0 & 0 & 0 \\ 0 & 0 & 0 \end{bmatrix}$$

If antennas 114, 116, and 118 are selected for the subcarrier and antenna 116 is to be punctured, then the following beamforming matrix may be used:

$$W = \begin{bmatrix} 1 & 0 & 0 \\ 0 & 0 & 0 \\ 0 & 0 & 1 \\ 0 & 0 & 0 \\ 0 & 0 & 0 \end{bmatrix}$$

and so on. As before, the control information may be generated, in various embodiments, within the receiving device, in the transmitting device itself, or in some other location.

Figure 8:
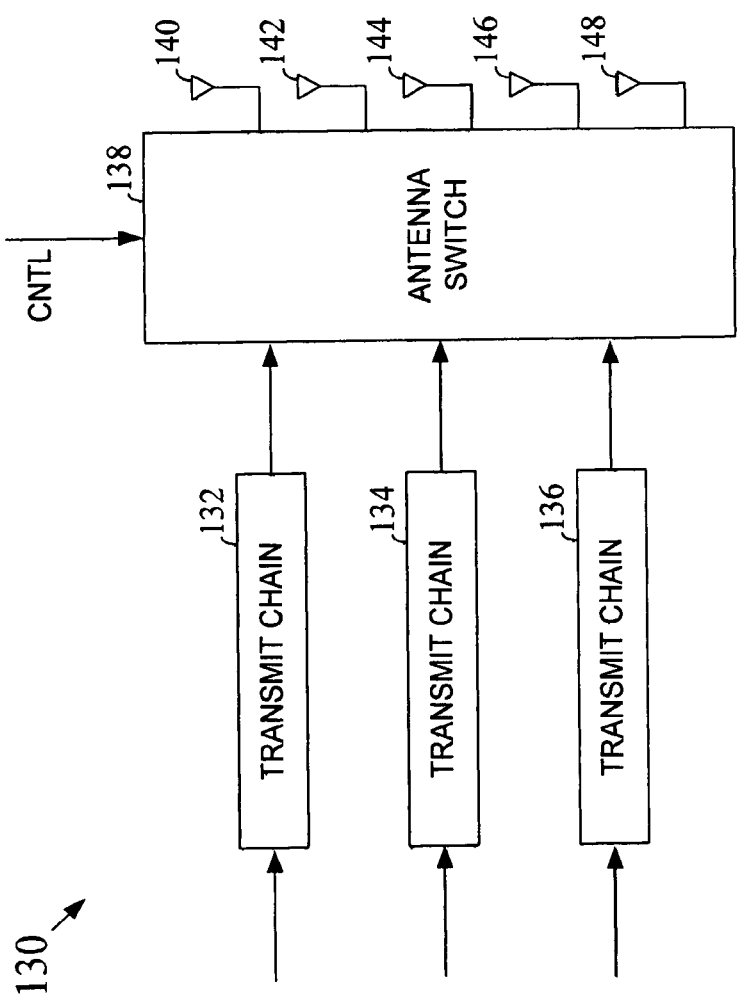
FIG. 8 is a block diagram illustrating an example antenna switch arrangement in accordance with an embodiment of the present invention.

In the transmitter system 110 of FIG. 7, each of the available transmit antennas 114, 116, 118, 120, 122 has a dedicated transmit chain 124 associated with it. To reduce implementation costs, it may be desirable to reduce the number of transmit chains 124 to equal the number of spatial streams. An antenna switch may then be used to select an antenna from the available antennas for each of the spatial streams. FIG. 8 is a block diagram illustrating an example antenna switch arrangement 130 in accordance with an embodiment of the present invention. The switch arrangement 130 may be used, for example, with the system 50 of FIG. 5 when the number of available antennas exceeds the number of spatial streams. As shown, the switch arrangement 130 includes multiple transmit chains 132, 134, 136 and an antenna switch 138. The number of transmit chains 132, 134, 136 is equal to the number of spatial streams being used. The antenna switch 138 is coupled to a plurality of antennas 140, 142, 144, 146, 148. As shown, the number of antennas (i.e., 5 in the illustrated embodiment) is greater than the number of transmit chains (i.e., 3 in the illustrated embodiment). The antenna switch 138 is operative for controllably coupling the output of each transmit chain 132, 134, 136 to an antenna selected for the corresponding spatial stream. The antenna switch 138 may receive control signals that identify how the connections are to be made. Antenna puncturing may be applied in the antenna puncture logic 68 (see FIG. 5).

In at least one embodiment of the invention, the antenna puncturing determination is performed using an exhaustive search approach. First, all of the antenna selection possibilities are determined, assuming antenna puncturing may be used. For each possibility, a performance metric may then be calculated (e.g., the Shannon capacity of the channel, etc.). The antenna selection possibility that results in the highest performance metric value may then be chosen for a subsequent transmission. Other techniques may alternatively be used.

Figure 9:
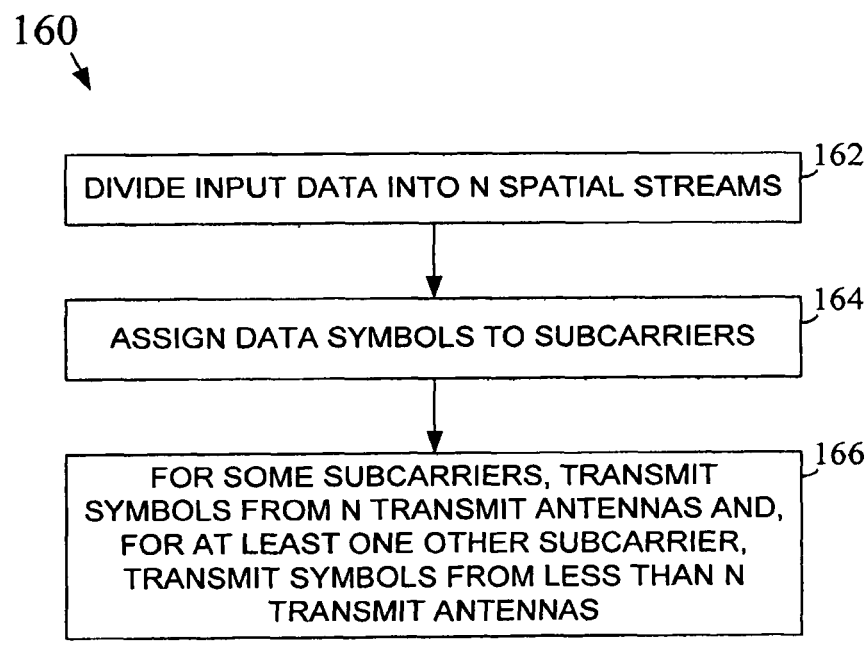
FIG. 9 is a flowchart illustrating an example method for performing antenna puncturing in accordance with an embodiment of the present invention.

FIG. 9 is a flowchart illustrating an example method 160 for performing antenna puncturing in accordance with an embodiment of the present invention. The method may be implemented within, for example, a MIMO-enabled device or system that is implementing spatial multiplexing. First, input data is divided into N spatial streams (block 162). Any number of spatial streams (two or more) may be used to perform spatial multiplexing. The data symbols in the spatial streams are then assigned to subcarriers of a multicarrier (e.g., OFDM) band (block 164). At a transmit time, for some of the subcarriers, the symbols in the spatial streams will be transmitted from N transmit antennas. That is, for these subcarriers, no antenna puncturing is performed. For at least one subcarrier, however, symbols are transmitted from less than N transmit antennas at the transmit time (block 166). This subcarrier has thus undergone antenna puncture. An example of this is shown in FIG. 4, where subcarriers 1, 3, 4, 6, 7, and 8 have undergone antenna puncture, while subcarriers 0, 2, and 5 have not. The antenna puncturing may be performed in response to control information. The control information may be generated remotely (e.g., in a remote receiving device, etc.) or locally (e.g., within the transmitting device itself). Antenna puncturing may not need to be performed for every transmit time.

In the discussion above, antenna puncturing is described in the context of physical transmit antennas. However, in at least one embodiment of the present invention, antenna puncturing is used in connection with "virtual antennas." The term "virtual antennas" refers to output probes that are connected to the physical antenna by some fixed combining matrix so that the generated signal is obtained by:

$$x=FWs$$

where F is a fixed matrix (e.g., the discrete Fourier transform matrix, etc.), W is the antenna puncturing matrix, and s is the vector of spatially expanded symbols. A more detailed description of virtual antennas can be found in "Description and Link Simulations of MIMO Schemes for OFDMA based E-UTRA Downlink Evaluation,"3GPP R1-050903, Qualcomm Europe, which is hereby incorporated by reference.

The techniques of the present invention are not limited to use within wireless systems. Applications within wired system also exist. For example, in at least one embodiment, puncturing techniques are used within a digital subscriber line (DSL) or asymmetrical digital subscriber line (ADSL) system.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

It should be appreciated that the individual blocks illustrated in the block diagrams herein may be functional in nature and do not necessarily correspond to discrete hardware elements. For example, in at least one embodiment, two or more of the blocks in a block diagram are implemented in software within a digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
splitting input data into N spatial streams to perform spatial multiplexing MIMO, where N is a positive integer greater than one;
for each spatial stream, assigning data symbols to data subcarriers of a multicarrier band; and
at a transmit time, transmitting data symbols from N transmit antennas for some data subcarriers in said multicarrier band and transmitting data symbols from the N spatial streams with less than N transmit antennas for at least one other data subcarrier in said multicarrier band, in response to control information, wherein transmitting data symbols from the N spatial streams with less than N transmit antennas for at least one other subcarrier is performed after the data symbols have been assigned to the data subcarrier to increase channel capacity in a corresponding MIMO channel.

2. The method of claim 1, wherein:
said control information is received from a remote receiving device before said transmit time.

3. The method of claim 2, wherein:
said remote receiving device generates said control information based on, among other things, channel information for said MIMO channel.

4. The method of claim 1, further comprising:
said control information is generated locally before said transmit time.

5. The method of claim 1, wherein:
transmitting data symbols from N transmit antennas for some subcarriers includes transmitting data symbols from N transmit antennas for a first subcarrier that has been assigned a total transmit power of $P_a$, wherein a power level of $P_a/N$ is transmitted from each of said N transmit antennas for said first subcarrier; and
transmitting data symbols from less than N transmit antennas for at least one other subcarrier includes transmitting data symbols from L transmit antennas for a second subcarrier that has been assigned a total transmit power of $P_b$, where L is less than N, wherein a power level of $P_b/L$ is transmitted from each of said L transmit antennas for said second subcarrier.

6. The method of claim 1, wherein:
said transmit antennas are virtual antennas.

7. An apparatus comprising:
a spatial stream interleaver to generate N spatial streams from input data, where N is a positive integer greater than one, said N spatial streams for use in performing spatial multiplexing MIMO;
a subcarrier assignment function for each of said N spatial streams to assign symbols from the spatial stream to data subcarriers of a multicarrier band; and
antenna puncture logic to perform antenna puncturing for said N spatial streams so that data symbols are transmitted, at a transmit time, from N transmit antennas for some data subcarriers of said multicarrier band and data symbols are transmitted from less than N transmit antennas for at least one other data subcarrier of said multicarrier band at a particular transmit time, wherein said antenna puncture logic performs said antenna puncturing after the data symbols have been assigned to the data subcarrier to increase capacity in a corresponding MIMO channel.

8. The apparatus of claim 7, wherein:
said antenna puncture logic performs said antenna puncturing in response to control information, wherein said control information is received from a remote receiving device.

9. The apparatus of claim 7, wherein:
said antenna puncture logic performs said antenna puncturing in response to control information, wherein said antenna puncture control information is generated locally based on channel information.

10. The apparatus of claim 7, wherein:
said subcarrier assignment function includes a serial-to-parallel converter.

11. The apparatus of claim 7, wherein:
said transmit antennas are virtual antennas.

12. The apparatus of claim 7, wherein:
when data symbols are transmitted from less than N transmit antennas for a first subcarrier, an assigned power for said first subcarrier is divided equally among said less than N transmit antennas.

13. An article comprising a storage medium having instructions stored thereon that, when executed by a computing platform, operate to:
split input data into N spatial streams to perform spatial multiplexing MIMO, where N is a positive integer greater than one;
for each spatial stream, assign data symbols to data subcarriers of a multicarrier band; and
at a transmit time, transmit data symbols from N transmit antennas for some data subcarriers in said multicarrier band and transmit data symbols from less than N transmit antennas for at least one other data subcarrier in said multicarrier band, in response to control information, wherein operation to transmit data symbols from less than N transmit antennas for at least one other subcarrier is performed after the data symbols have been assigned to the data subcarrier to increase channel capacity in a corresponding MIMO channel.

14. The article of claim 13, wherein:
said control information is received from a remote receiving device, before said transmit time.

15. The article of claim 14, wherein:
said remote receiving device generates said antenna puncture control information based on, among other things, channel information for said corresponding MIMO channel.

16. The article of claim 13, wherein:
said control information is generated locally, before said transmit time.

17. A system comprising:
a plurality of dipole transmit antennas;
a spatial stream interleaver to generate N spatial streams from input data, where N is a positive integer greater than one, said N spatial streams for use in performing spatial multiplexing MIMO;
a subcarrier assignment function for each of said N spatial streams to assign symbols from the spatial stream to data subcarriers of a multicarrier band; and
antenna puncture logic to perform antenna puncturing for said N spatial streams
so that data symbols are transmitted, at a transmit time, from N transmit antennas for some data subcarriers of said multicarrier band and data symbols are transmitted from less than N transmit antennas for at least one other data subcarrier of said multicarrier band at a particular transmit time, wherein said antenna puncture logic performs said antenna puncturing to increase capacity in a corresponding MIMO channel.

18. The system of claim 17, wherein:
said antenna puncture logic performs said antenna puncturing in response to control information, wherein said control information is received from a remote receiving device.

19. The system of claim 17, wherein:
said antenna puncture logic performs said antenna puncturing in response to control information, wherein said antenna puncture control information is generated locally based on channel information.

20. The system of claim 17, wherein:
said plurality of dipole transmit antennas includes more than N dipole transmit antennas.

* * * * *